United States Patent
Honegger et al.

(10) Patent No.: US 11,822,866 B2
(45) Date of Patent: Nov. 21, 2023

(54) COMPUTER-ASSISTED METHOD FOR DETERMINING A MICROFLUIDIC CIRCUIT ARCHITECTURE REPRODUCING A NEURONAL CIRCUIT

(71) Applicant: NETRI, Lyons (FR)

(72) Inventors: Thibault Honegger, Lyons (FR); Florian Larramendy, Lyons (FR)

(73) Assignee: NETRI, Lyons (FR)

(*) Notice: Subject to any disclaimer, the term of this patent is extended or adjusted under 35 U.S.C. 154(b) by 174 days.

(21) Appl. No.: 17/429,502

(22) PCT Filed: Jan. 28, 2020

(86) PCT No.: PCT/FR2020/050129
§ 371 (c)(1),
(2) Date: Aug. 9, 2021

(87) PCT Pub. No.: WO2020/161412
PCT Pub. Date: Aug. 13, 2020

(65) Prior Publication Data
US 2022/0121801 A1 Apr. 21, 2022

(30) Foreign Application Priority Data
Feb. 7, 2019 (FR) ...................................... 19/01210

(51) Int. Cl.
*G06F 30/39* (2020.01)
*G06F 111/04* (2020.01)
*G06N 3/06* (2006.01)

(52) U.S. Cl.
CPC .......... *G06F 30/39* (2020.01); *G06F 2111/04* (2020.01); *G06N 3/06* (2013.01)

(58) Field of Classification Search
USPC ........................................................ 716/110
See application file for complete search history.

(56) References Cited

U.S. PATENT DOCUMENTS

| 2016/0154908 A1* | 6/2016 | Maddala | ................. G06F 30/20 703/1 |
| 2018/0121590 A1* | 5/2018 | Brisk | .................... B81C 99/006 |

(Continued)

OTHER PUBLICATIONS

English Translation to International Search Report for Application No. PCT/FR2020/050129.

(Continued)

*Primary Examiner* — Mohammed Alam
(74) *Attorney, Agent, or Firm* — CANTOR COLBURN LLP

(57) ABSTRACT

A computer-assisted method for determining a microfluidic circuit configured to reproduce a neuron circuit, and comprising including the following steps: —obtaining a description of the neuron circuit, the description of the neuron circuit comprising a plurality of neuron populations and at least one neuron connection; —determining at least one first parameter for each node of a plurality of nodes of the microfluidic circuit, each node being associated with and configured to receive one neuron population among the plurality of neuron populations of the neuron circuit; —determining at least one second parameter for at least one connection of the microfluidic circuit, each connection being associated with and configured to receive a neuron connection of the at least one neuron connection of the neuron circuit; —determining the positioning of each node of the plurality of nodes and of each connection of the at least one connection.

16 Claims, 2 Drawing Sheets

(56) References Cited

U.S. PATENT DOCUMENTS

| | | | | |
|---|---|---|---|---|
| 2019/0318054 A1* | 10/2019 | Hickman | ............... | G06F 30/23 |
| 2019/0383783 A1* | 12/2019 | Azpiroz | ............... | G06N 3/08 |
| 2021/0397952 A1* | 12/2021 | Sarioglu | ............ | G01N 15/1031 |
| 2022/0121801 A1* | 4/2022 | Honegger | ............... | G06F 30/39 |

OTHER PUBLICATIONS

International Search Report for Application No. PCT/FR2020/050129.

Juan Eduardo Sosa-Hernandez et al.; "Organs-on-a-Chip Module: A Review from the Development and Applications Perspective", Micromachines, vol. 9, Nr: 10, p. 536.

Luc Libralesso et al.: "Créer des cerveaux grâce à la recherche opérationnelle?" May 17, 2018; https://hal.archives-buvertes.fr/hal-01808145/document.

Sarasu S. et al.; "Design and development of organ on chip using microfluidic technology for simulation", 2013 International Conference on Optical Imaging Sensor and Security (ICOSS), Jul. 2, 2013 IEEE, pp. 1-6.

Soe Aung K. et al. "Lab-on-a-Chip turns soft: Computer-aided, software-enabled microfluidics design" 2013 IEEE/ACM International Conference on Advances in Social Networks Analysis and Mining (ASONAM 2013), Aug. 25, 2013 ACM and IEEE, Aug. 25, 2013, pp. 968-971.

Wijdeven Rosanne Van De et al. ; "Structuring a multi-nodal neural networkin vitrowithin a novel design microfluidic chip", Biomed Microdevices, Jan. 2, 2018 Kluwer Dordrecht, NL-ISSN 1387-2176, vol. 20, Nr:1, pp. 1-8.

Written Opinion for Application No. PCT/FR2020/050129.

* cited by examiner

[Fig. 1]
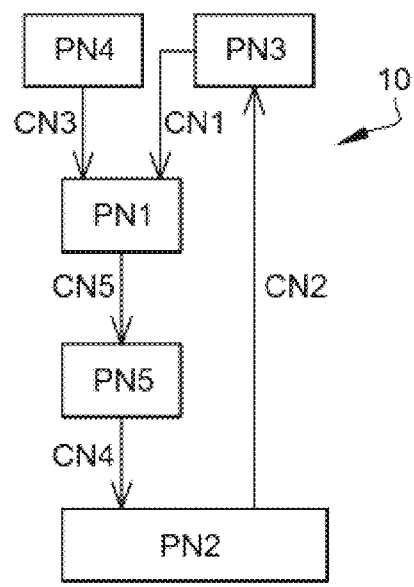
[Fig. 2]
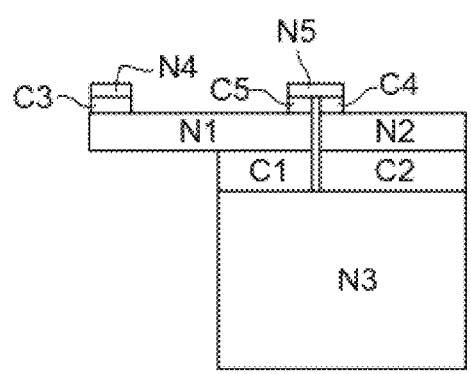

[Fig. 3]
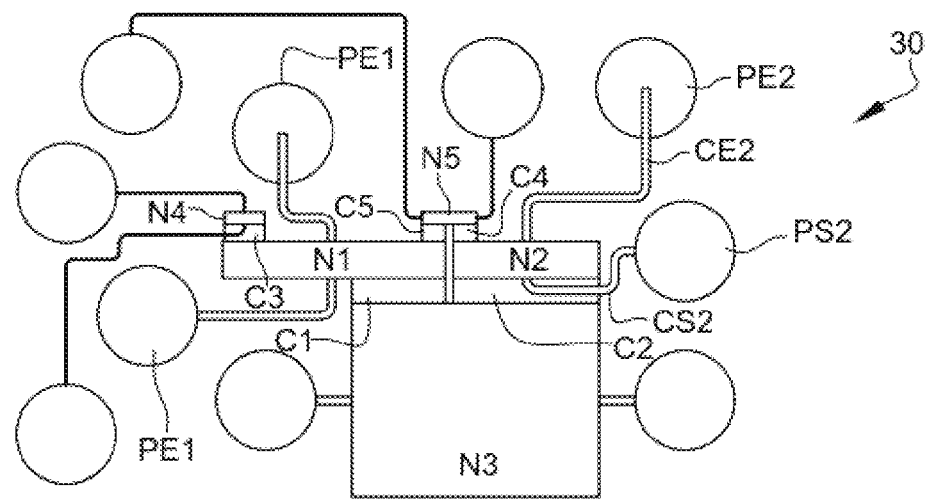
[Fig. 4]
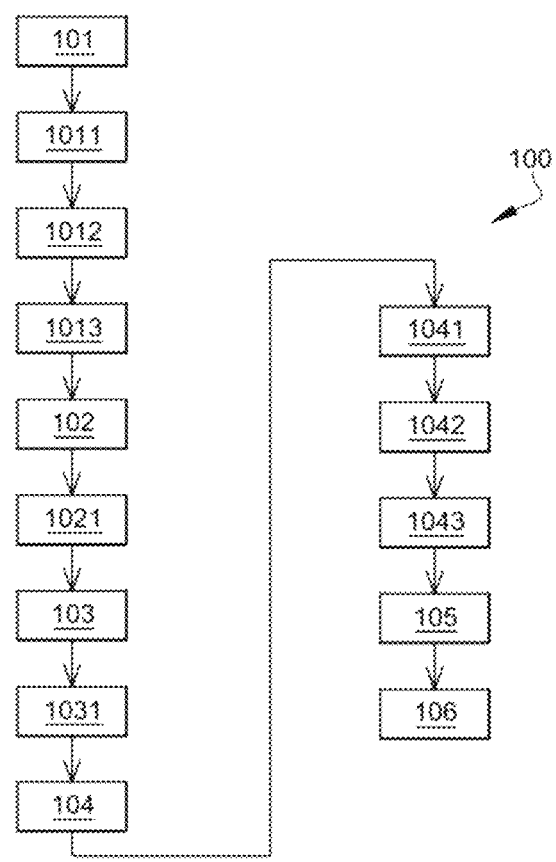

COMPUTER-ASSISTED METHOD FOR DETERMINING A MICROFLUIDIC CIRCUIT ARCHITECTURE REPRODUCING A NEURONAL CIRCUIT

CROSS REFERENCE TO RELATED APPLICATIONS

This application is a National Stage of PCT Application No. PCT/FR2020/050129 filed on Jan. 28, 2020, which claims priority to French Patent Application No. 19/01210 filed on Feb. 7, 2019, the contents each of which are incorporated herein by reference thereto.

TECHNICAL FIELD

The present invention concerns the field of microfluidic circuit architectures, and in particular microfluidic circuit architectures reproducing a neuronal circuit.

BACKGROUND

It is known in neurosciences to use microfluidic circuits configured in two chambers separated by micro-channels. This spatial compartmentalization makes it possible to physically separate two populations of neurons and to grow the neurites inside the micro-channels to ensure neuronal connections.

The microfluidic configuration makes it possible to cultivate different neurons and, consequently, in different media, while ensuring a functional connectivity, i.e. a transmission of information between the neurons.

Numerous "neurofluidic" chip architectures have been the subject of research, focusing mainly on the neurobiology of a few neurons and on the analysis of the transmission of signals, between a maximum of two or three populations, to answer fundamental neuroscience issues or address biological hypotheses for neurodegenerative diseases.

Nevertheless, these chips are content to model small circuits typically comprising up to 3 populations of neurons, at most, and therefore 3 compartments to accommodate them. There are also devices which make it possible to connect neurons on an individual scale, or several dozens of neurons together to reproduce a basic circuit, but which all use the same types of neurons.

The drawbacks of known devices lie in the fact that they do not simultaneously allow:
  Cultivating several types of neurons in the same device, for lack of appropriate compartments,
  Connecting more than 3 populations of neurons,
  Checking the quantity of neurons in each compartment, or the level of connectivity between compartments when they exist,
  Creating neuronal circuits of high complexity, and/or of physiological significance, able to receive several millions of neurons connected to each other.

Hence, the invention aims at providing a solution to all or part of these problems.

BRIEF SUMMARY

To this end, the present invention concerns a computer-assisted method for determining a microfluidic circuit, the microfluidic circuit being configured to reproduce a neuronal circuit, and comprising the following steps:
  obtaining a description of the neuronal circuit, the description of the neuronal circuit comprising a plurality of neuronal populations and at least one neuronal connection, each neuronal population comprising at least one neuron, each neuronal connection of the at least one neuronal connection linking one neuronal population of the plurality of neuronal populations to another neuronal population of the plurality of neuronal populations by a neuronal link between the at least one neuron from the neuronal population and at least one other neuron from the other neuronal population;
  determining at least one first parameter for each node of a plurality of nodes of the microfluidic circuit, each node of the plurality of nodes of the microfluidic circuit being associated with and configured to receive one neuronal population among the plurality of neuronal populations of the neuronal circuit;
  determining at least one second parameter for at least one connection of the microfluidic circuit, each connection of the at least one connection linking one node of the plurality of nodes to at least one other node of the plurality of nodes, each connection of the at least one connection of the microfluidic circuit being associated with and configured to receive one neuronal connection from the at least one neuronal connection of the neuronal circuit;
  determining the positioning of each node of the plurality of nodes and of each connection of the at least one connection.

According to one implementation, the invention comprises one or more of the following features, considered alone or in combination.

According to one implementation, the at least one connection comprises a plurality of connections, i.e. two connections or more.

According to one implementation, the at least one neuron comprises a plurality of neurons, i.e. two neurons or more.

According to one implementation, for at least one node of the plurality of nodes of the microfluidic circuit, the node is in fluid communication with an inlet sink of the node via an input channel of the node and with an output sink of the node via an output channel of the node, and the method comprises a step of positioning the input sink and the input channel of the node, and positioning the output sink and the output channel of the node.

According to one implementation, the method comprises a step of adjusting the positioning of each node of the plurality of nodes and of each connection of the at least one connection after the step of positioning the input sink and the input channel of each node, and positioning the output sink and the output channel of each node.

According to one implementation, the step of obtaining the description comprises:
  determining a first number of nodes of the plurality of nodes;
  determining at least one first characteristic of each node of the plurality of nodes, the at least one first characteristic comprising at least one amongst:
  a second number of neurons from the neuronal population associated with the node, and
  a height, and
  a width, and
  a surface area, and
  a volume, and
  a shape,
  determining at least one second characteristic of each connection of the at least one connection, the at least one second characteristic comprising at least one amongst:

unidirectional or bidirectional, and
a functional weight, and
a structural weight, and
a distance between the nodes, According to one implementation, the at least one first characteristic of each node comprises a second number of neurons of the neuronal population associated with the node.

According to one implementation, the at least one first characteristic of each node comprises a height.

According to one implementation, the at least one first characteristic of each node comprises a width.

According to one implementation, the at least one first characteristic of each node comprises a surface area.

According to one implementation, the at least one first characteristic of each node comprises a volume.

According to one implementation, the at least one first characteristic of each node comprises a shape.

According to one implementation, the at least one second characteristic of the at least one connection comprises the unidirectional feature.

According to one implementation, the at least one second characteristic of the at least one connection comprises the bidirectional feature.

According to one implementation, the at least one second characteristic of the at least one connection comprises a functional weight.

According to one implementation, the at least one second characteristic of the at least one connection comprises a structural weight.

According to one implementation, the at least one second characteristic of the at least one connection comprises a distance between the nodes.

According to one implementation, the description is a graphical description, or a matrix description.

According to one implementation, the graphical description comprises a plurality of graphical objects, each graphical object corresponding to a node of the neuronal circuit, and a plurality of graphical links, each graphical link linking a graphical object to another graphical object, and each graphical link corresponding to a neuronal connection of the neuronal circuit.

According to one implementation, the matrix description comprises at least one matrix, each matrix of the at least one matrix comprising a number of rows and a number of columns equal to the number of nodes, each node being associated with a row and a column of the matrix, a binary value or a percentage at the intersection between a row and a column indicating a presence or an absence, according to said binary value, or a relative weight, or a relative distance, according to said percentage, of a connection between the node associated with the row and the other node associated with the column.

According to one implementation, the step of determining at least one first parameter for each node of the plurality of nodes comprises the selection of a first process among:
a deposition chamber process, and
a millimeter spatial confinement process, and
a colloidal support structure process.
the determination of the at least one first parameter of each node of the plurality of nodes being a function of the chosen implementation process.

According to one implementation, the deposition chamber process comprises the creation of a deposition chamber for each node of the plurality of nodes.

According to these arrangements, it is possible to size the chambers according to the number of neurons in the population of neurons that the node must receive.

According to one implementation, the step of determining at least one second parameter for the at least one connection comprises the selection of a second implementation process, the determination of the at least one second parameter of the at least one connection being a function of the second chosen implementation process.

According to one implementation, the second implementation process comprises a step of making micro-channels to implement a connection, a geometry of the micro-channels being determined according to the characteristics of the connection.

According to one implementation, the second implementation process comprises a step of implementing a bidirectional connection by collagen fibers or by a set of micro-channels parallel and symmetrically juxtaposed on either side of a common direction, some channels being oriented in one direction and other channels being oriented in the opposite direction.

According to one implementation, the step of positioning each node of the plurality of nodes and the at least one connection comprises the following sub-steps:
determining at least one maximum dimension of the microfluidic circuit according to at least one first constraint associated with the first selected implementation process, and according to at least one second constraint associated with the second selected implementation process;
for each node of the plurality of nodes, determining the position of the node according to the maximum dimension of the circuit, and the at least one first characteristic of the node, and the at least one first parameter of the node and the at least one first constraint associated with the first selected creation process, and according to the at least one second constraint associated with the second selected process;
determining the position of the at least one connection linking a node to another node, according to the position and to the at least one first characteristic of the node and according to the position and the at least one first characteristic of the other node, and according to the at least one second characteristic and the at least one second parameter of the connection and according to the at least one first constraint associated with the first implementation process, and according to the at least one second constraint associated with the second implementation process.

BRIEF DESCRIPTION OF THE DRAWINGS

For a better understanding thereof, the invention is described with reference to the appended drawings representing, as a non-limiting example, an implementation of a method according to the invention. The same reference numerals in the drawings denote similar elements or elements having similar functions.

FIG. 1 is a graphical description of a neuronal circuit.

FIG. 2 is an illustration of a microfluidic circuit created from the graphical description, without the input and output sinks and channels of each node of the microfluidic circuit.

FIG. 3 is an illustration of a microfluidic circuit created from the graphical description.

FIG. 4 is a schematic representation of the steps of an implementation of the method according to the invention.

DETAILED DESCRIPTION

FIG. 1 is an example of a graphical description 10 of a neuronal circuit. The description of an embodiment of the method 100 is given with reference to FIGS. 1, 2, 3 and with reference to FIG. 4. A first step 101 of reading this graphical description 10 indicates that the considered neuronal circuit comprises a plurality of neuronal populations PN1, PN2, PN3, PN4, PN5 and at least one neuronal connection CN1, CN2, CN3, CN4, CN5.

Each neuronal population PN1, PN2, PN3, PN4, PN5 comprises one or several neuron(s).

Each neuronal connection CN1, CN2, CN3, CN4, CN5 of the at least one neuronal connection CN1, CN2, CN3, CN4, CN5 links a neuronal population of the plurality of neuronal populations PN1, PN2, PN3, PN4, PN5 to another neuronal population of the plurality of neuronal populations PN1, PN2, PN3, PN4, PN5 by a neuronal link between the at least one neuron of the neuronal population and at least one other neuron of the other neuronal population. Said neuronal connection is established by a synaptic connection between the neurons, or only via the extensions of the neurites, axons or dendrites, associated with the connected neurons.

An object of the method 100 is the definition of a microfluidic circuit 30, as illustrated in FIG. 3, the microfluidic circuit 30 being configured to reproduce the operation of the neuronal circuit read in the description 10; the microfluidic circuit 30 comprises a plurality of nodes N1, N2, N3, N4, N5 and at least one connection C1, C2, C3, C4, each connection C1, C2, C3, C4, C5 linking one node of the plurality of nodes N1, N2, N3, N4, N5 to at least one other node of the plurality of nodes N1, N2, N3, N4, N5.

For the microfluidic circuit 30 to be able to reproduce the operation of the neuronal circuit read in the description 10, each node of the plurality of nodes N1, N2, N3, N4, N5 of the microfluidic circuit 30 is associated with and configured to receive one neuronal population PN1, PN2, PN3, PN4, PN5 among the plurality of neuronal populations PN1, PN2, PN3, PN4, PN5 of the neuronal circuit, and each connection C1, C2, C3, C4, C5 of the microfluidic circuit 30 is associated with and configured to receive one neuronal connection CN1, CN2, CN3, CN4, CN5 of the at least one neuronal connection CN1, CN2, CN3, CN4, CN5 of the neuronal circuit.

To this end, the method 100 comprises the following steps, implemented after the step 101 of reading the description:
creating 102 each node N1, N2, N3, N4, N5 of the plurality of nodes N1, N2, N3, N4, N5;
creating 103 each connection CN1, CN2, CN3, CN4, CN5 of the at least one connection CN1, CN2, CN3, CN4, CN5,
Positioning 104 each node N1, N2, N3, N4, N5 of the plurality of nodes and each connection CN1, CN2, CN3, CN4, CN5 of the at least one connection.

According to one implementation, for at least one node N1, N2, N3, N4, N5 of the plurality of nodes N1, N2, N3, N4, N5 of the microfluidic circuit 30, the node is in fluid communication with an input sink PE1, PE2 of the node via an input channel CE2 of the node and with an output sink PS1, PS2 of the node via an output channel CS2 of the node, and the method comprises a step of positioning 105 the input sink PE1, PE2 and the input channel CE2 of the node, and positioning the output sink PS1, PS2 and the output channel CS2 of the node.

According to one implementation, the method comprises a step 106 of adjusting the positioning of each node of the plurality of nodes and of each connection of the at least one connection after the step 105 of positioning the input sink and the input channel of each node, and of positioning the output sink and the output channel of each node.

According to one implementation, the node may be merged with the input sink and the output sink.

According to one implementation, the step 101 of reading the description 10 comprises:
determining 1011 the number of nodes of the plurality of nodes N1, N2, N3, N4, N5;
determining 1012 the characteristics of each node of the plurality of nodes;

The characteristics taken into account for a node comprise in particular:
the number of neurons in the neuronal population associated with the node, and/or
a height of the node, and/or
a width of the node, and/or
a surface area of the node, and/or
a volume of the node, and/or
a shape of the node, which may for example be a circular, square, rounded or star shape.

The characteristics of the nodes corresponding to the neuronal circuit of the description 10 are summarized, as example, in the Table 1 below.

TABLE 1

|  | Volume ($mm^3$) | Surface area ($m^2$) | Number of neurons |
|---|---|---|---|
| PN3 | 470 | $8.84*10^{-4}$ | 5000000 |
| PN2 | 48 | $9.02*10^{-4}$ | 510638 |
| PN1 | 72 | $1.35*10^{-4}$ | 765957 |
| PN4 | 4.27 | $8.02*10^{-4}$ | 45426 |
| PN5 | 6 | $1.13*10^{-4}$ | 63830 |

The step 101 of reading the description 10 also comprises the determination 1013 of the characteristics of each connection.

Some of the characteristics taken into account for each connection include in particular:
the unidirectional or bidirectional nature of the connection, and/or
a functional weight of the connection, and/or
a structural weight of the connection, and/or
a distance between the nodes connected by the connection.

The description 10 may be in the form of a graphical description 10, or a matrix description.

According to one implementation, the graphical description 10 comprises a plurality of graphical objects, each graphical object corresponding to a node of the neuronal circuit, and a plurality of graphical links, each graphical link linking a graphical object to another graphical object, and each graphical link corresponding to a neuronal connection of the neuronal circuit.

According to one implementation, the matrix description comprises a matrix comprising a number of rows and a number of columns equal to the number of nodes, each node being associated with a row and a column of the matrix, a binary value or a percentage at the intersection between a row and a column indicating a presence or an absence according to said binary value, or a weight according to said percentage of a connection between the node associated with the row and the other node associated with the column.

The connections between the nodes corresponding to the neuronal circuit of the description 10 are represented, as example, in the form of a matrix description in Table 2 below. Each cell of the matrix located at the intersection of a row and a column bears the information relating to the connection between the node associated with this row and the node associated with the column. Thus, the value 1 or 0 respectively indicates the existence or the absence of a connection between these nodes. The other characteristics, specific to each connection, can thus be found in the corresponding cell of a matrix description of the same type, associated with each connection characteristic to be taken into account.

Thus, as example, Tables 2, 3 and 4 below describe in a matrix form an interconnection network between the neuronal populations PN1, PN2, PN3, PN4 and PN5 of the nodes N1, N2, N3, N4 and N5, with in Table 2 the matrix containing the information relating to the existence of a connection between two nodes, in Table 3 the matrix containing the information on the relative weight of each connection, and in Table 4 the matrix containing the information relating to the distances between each node.

TABLE 2

|     | PN3 | PN2 | PN1 | PN4 | PN5 |
| --- | --- | --- | --- | --- | --- |
| PN3 | 0   | 0   | 1   | 0   | 0   |
| PN2 | 1   | 0   | 0   | 0   | 0   |
| PN1 | 0   | 0   | 0   | 0   | 1   |
| PN4 | 0   | 0   | 1   | 0   | 0   |
| PN5 | 0   | 1   | 0   | 0   | 0   |

TABLE 3

|     | PN3  | PN2 | PN1  | PN4 | PN5 |
| --- | ---  | --- | ---  | --- | --- |
| PN3 | 0    | 0   | 0.42 | 0   | 0   |
| PN2 | 0.53 | 0   | 0    | 0   | 0   |
| PN1 | 0    | 0   | 0    | 0   | 1   |
| PN4 | 0    | 0   | 0.8  | 0   | 0   |
| PN5 | 0    | 0.2 | 0    | 0   | 0   |

TABLE 4

|     | PN3  | PN2  | PN1  | PN4 | PN5  |
| --- | ---  | ---  | ---  | --- | ---  |
| PN3 | 0    | 0    | 0.64 | 0   | 0    |
| PN2 | 0.61 | 0    | 0    | 0   | 0    |
| PN1 | 0    | 0    | 0    | 0   | 0.23 |
| PN4 | 0    | 0    | 1    | 0   | 0    |
| PN5 | 0    | 0.57 | 0    | 0   | 0    |

After the step of reading 101 the matrix or graphical description of the neuronal circuit, the method 100 comprises a step of creating 102 each node. The creation 102 of the nodes comprises the selection 1021 of an implementation process of each node.

An implementation process is for example a chamber deposition process. According to this process, the nodes are implemented with:
- an input sink adapted to receive a liquid including a sample of the neuronal population associated with the node,
- a deposition chamber, coincident with the node, in which at least part of the sample is confined,
- an output sink adapted to evacuate the liquid;
- an input channel linking the input sink and the deposition chamber;
- an output channel linking the deposition chamber and the output sink;
- the input channel and the output channel having heights equal to the heights of the input and output sinks, and being arranged relative to each other such that the liquid received by the input sink flows through the input channel, the deposition chamber, i.e. the node, then the output channel to the output sink. The respective dimensions of the input channel and of the output channel are adapted so that during the flow of the liquid, at least part of the sample of the considered neuronal population is confined in the deposition chamber, i.e. in the node, and the spatial distribution of the sample in the deposition chamber is monitored.

According to these arrangements, it is possible to size the deposition chambers, and therefore the nodes, according to the number of neurons of the population of neurons that the node must receive.

Another process of implementation is for example the process known to those skilled in the art under the name of millimeter spatial confinement process.

Another implementation process is for example the process known to those skilled in the art under the name of process based on the use of colloid-based support structures; according to this process of implementation, the nodes are formed by an aggregation of colloids and neurons.

The method 100 also comprises a step of creating 103 each connection of the circuit which is the object of the matrix or graphical description 10 read at step 101.

The creation of a connection comprises selecting 1031 a process of implementing the connections.

Among the processes known to those skilled in the art, for implementing a connection, a connection may be in the form of micro-channels, the geometry of which is determined according to the characteristics of the connection; a bidirectional connection may also be implemented by collagen fibers or by symmetrically juxtaposed channels on either side of a common direction, some channels being oriented in one direction and other channels being oriented in the opposite direction.

The method finally comprises a step of positioning and sizing 104 each node of the plurality of nodes and each connection of the at least one connection.

The positioning and sizing of each node and each associated connection comprises the following sub-steps:
- determining 1041 at least one maximum dimension of the microfluidic circuit according to at least one first constraint associated with the first selected creation process, and according to at least one second constraint associated with the second selected process;
- for each node of the plurality of nodes, determining 1042 the position of the node according to the maximum dimension of the circuit, and according to the at least one first characteristic of the node, and according to the at least one first constraint associated with the first selected creation process, and according to the at least one second constraint associated with the second selected process;
- for each connection linking one node to another node, determining 1043 the position of the connection, according to the position and the at least one first characteristic of the node and according to the position and the at least one first characteristic of the other node, and according to the at least one second characteristic of the connection and according to the at least one first constraint associated with the first selected creation process, and according to the at least one second constraint associated with the second selected process;

Thus, as example:
- a maximum dimension of the microfluidic circuit corresponding to the matrix or graphical description 10 can be determined, the manufacturing constraints at 20 mm×30 mm;
- similarly, a minimum dimension for the input sinks can be determined by the constraint of being able to insert a pipette, i.e. a dimension of the input sinks determined at least at 4 mm in diameter;
- the dimensions of the micro-channels can also be determined, also due to manufacturing constraints, at 3 µm in height and 5 µm in width;
- the distances between the nodes can be determined by the graphical 10 or matrix description;
- the dimensioning of the nodes is determined according to the deposition chamber process.

On the basis of the above constraints, and of the characteristics of the nodes and connections deduced from reading the graphical 10 or matrix description, FIG. 2 illustrates a result of the step of determining 1042 the position of each node of the circuit and FIG. 3 illustrates the result of the step of determining 1043 the connections, when the process chosen for the implementation of the nodes is the deposition chamber process, and the process chosen for the implementation of the connections is based on the use of micro-channels.

Thus, for each node, the chamber sizing procedure is as follows:

1- a surface area is calculated for a deposition chamber suited to receive the number of neurons of the considered population, taking into account a diameter determined according to the considered type of neuron. For example, for hippocampal neurons, the diameter of the neuron taken into account for the calculation of the surface area of the deposition chamber is 15 µm. Alternatively, according to a so-called volumetric process, it is possible to calculate a volume of the deposition chamber instead of calculating a deposition surface area of the neurons. Alternatively, it is possible to consider whole explants, the dimension of the chamber being determined so as to be adapted to the size of the targeted explant.

2- a rectangular chamber is created whose surface area is constrained for each node to the previously calculated one, the choice of a length or a width constituting a degree of freedom. Alternatively, the chamber may have a different shape (circular, lozenge) at equivalent surface. Alternatively, according to the volumetric process, the surface area is determined according to a height of the chamber created and the shape of the surface can be arbitrarily chosen. Alternatively for an explant, the volume is fixed by that of the explant.

3- the chambers thus dimensioned are positioned in a plane, meeting the constraints of distances possibly provided. FIG. 2 illustrates a result of this positioning step.

Then, input and output channels, also called loading or unloading channels, of the deposition chambers are created and positioned. For this purpose, loading/unloading channels are built according to the intended process for loading the cells. In general, the input/output channels are connected to the deposition chambers and sized so that a laminar flow is achievable and allows deposition of cells in the chambers prior to settling.

In the case of the deposition chamber process, these input/output channels are dimensioned in a manner known to those skilled in the art, so that the flow in the deposition chamber of a carrier fluid medium, is characterized by the following relationship:

$$V_{ch} \leq V_{sedi} = \frac{H_{ch}}{D_{ch}} \qquad \text{[Math 1]}$$

in which $H_{Ch}$ and $D_{Ch}$ denote respectively the height and the diameter of a deposition chamber, and $V_{sedi}$ denotes a sedimentation rate of the cells carried by the carrier fluid, and $V_{Ch}$ denotes a flow rate of the carrier fluid medium.

4- Once the input/output channels have been defined and positioned, it is necessary to check that there is no incompatibility with the manufacturing processes used. In the case of the deposition chamber process, the input/output channels cannot cross one another and cannot cross another deposition chamber.

5- the previous steps are repeated until a solution compliant with the feasibility constraints is found. In the example illustrated in FIGS. 1, 2 and 3, the result illustrated in FIG. 2 represents the solution adopted for sizing and positioning of the nodes, with their respective input and output channels, among the 324 possibilities calculated beforehand by computer, this solution being the only one which meets the technical feasibility criterion according to the process of manufacture of the device; but possibly another solution could have been chosen on the basis of another manufacturing process.

7- After sizing and positioning of the nodes with their respective input and output channels, inter-node connections are created, according to a connection implementation process, based for example on the choice of connection micro-channels. For this purpose, the dimensions of the channels are established, according to the considered cell types, in a manner conventionally known to those skilled in the art (5 µm wide, 3 µm high, spacing of 5 µm). The micro-channels are positioned between the nodes in order to maximize the number of micro-channels between each node according to the connectivity described in the connection matrix. If a weight matrix is provided with the matrix description, the maximum possible number of channels is given by the weight equal to 1 and relative to the number of micro-channels according to the matrix.

8- Micro-channels are suitable for directionality. According to the connection matrix, an adaptation is made to the geometry of the previously dimensioned micro-channels. Thus, by choosing a so-called fir process, known to those skilled in the art, the previously dimensioned micro-channels are deformed from rectangle into triangles, the finest constriction of which represents the desired direction of propagation.

9- Finally, input/output tanks are positioned. The input/output channels are assigned to tanks proportioned according to the type of cell used. In the case illustrated here as example, the tanks consist of cylinders 4 mm in diameter and 5 mm in height.

10- A 3D plane of the entire chip can then be produced, with the 3D dimensions of all nodes and channels. A 2D projection of the plane is represented as example in FIG. 3.

The invention claimed is:

1. A computer-assisted method for determining a microfluidic circuit, the microfluidic circuit being configured to reproduce a neuronal circuit, and comprising the following steps:
   obtaining a description of the neuronal circuit, the description of the neuronal circuit comprising a plurality of neuronal populations and at least one neuronal connection, each neuronal population comprising at least one neuron, each neuronal connection of the at least one neuronal connection linking one neuronal population of the plurality of neuronal populations to another neuronal population of the plurality of neuronal populations by a neuronal link between the at least one neuron of the neuronal population and at least one other neuron of the another neuronal population;
   determining at least one first parameter for each node of a plurality of nodes of the microfluidic circuit, each node of the plurality of nodes of the microfluidic circuit being associated with and configured to receive one neuronal population among the plurality of neuronal populations of the neuronal circuit;
   determining at least one second parameter for at least one connection of the microfluidic circuit, each connection of the at least one connection linking one node of the plurality of nodes to at least one other node of the plurality of nodes, each connection of the at least one connection of the microfluidic circuit being associated with and configured to receive one neuronal connection of the at least one neuronal connection of the neuronal circuit;
   determining the positioning of each node of the plurality of nodes and of each connection of the at least one connection.

2. The method according to claim 1, wherein the step of obtaining the description comprises:
   determining a first number of nodes of the plurality of nodes;
   determining at least one first characteristic of each node of the plurality of nodes, the at least one first characteristic comprising at least one amongst:
   a second number of neurons of the neuronal population associated with the node, and
   a height, and
   a width, and
   a surface area, and
   a volume, and
   a shape,
   determining at least one second characteristic of each connection of the at least one connection, the at least one second characteristic comprising at least one amongst:
   unidirectional or bidirectional, and
   a functional weight, and
   a structural weight, and
   a distance between the plurality of nodes.

3. The method according to claim 1, wherein the description is a graphical description, or a matrix description.

4. The method according to claim 2, wherein the step of determining at least one first parameter for each node of the plurality of nodes comprises selecting a first implementation process among:
   a deposition chamber process, and
   a millimeter spatial confinement process, and
   a colloidal support structure process,
   the step of determining of the at least one first parameter of each node of the plurality of nodes being a function of the first implementation process.

5. The method according to claim 4, wherein the step of determining at least one second parameter for the at least one connection comprises selecting a second implementation process, the step of determining the at least one second parameter of the at least one connection being a function of the second implementation process.

6. The method according to claim 5 wherein the step of positioning each node of the plurality of nodes and the at least one connection comprises the following sub-steps:
   determining at least one maximum dimension of the microfluidic circuit according to at least one first constraint associated with the first implementation process, and according to at least one second constraint associated with the second implementation process;
   for each node of the plurality of nodes, determining a position of the node according to a maximum dimension of the microfluidic circuit, and the at least one first characteristic of the node, and the at least one first parameter of the node and the at least one first constraint associated with the first implementation process, and according to the at least one second constraint associated with the second implementation process;
   determining a position of the at least one connection linking the one node of the plurality of nodes to the at least one other node of the plurality of nodes, according to a position and the at least one first characteristic of the node of the plurality of nodes and according to a position and the at least one first characteristic of the at least one other node of the plurality of nodes, and according to the at least one second characteristic and the at least one second parameter of the connection and according to the at least one first constraint associated with the first implementation process, and according to the at least one second constraint associated with the second implementation process.

7. The method according to claim 2, wherein the description is a graphical description, or a matrix description.

8. The method according to claim 1, wherein the step of determining at least one first parameter for each node of the plurality of nodes comprises selecting a first implementation process among:
   a deposition chamber process, and
   a millimeter spatial confinement process, and
   a colloidal support structure process,
   the step of determining the at least one first parameter of each node of the plurality of nodes being a function of the first implementation process.

9. The method according to claim 3, wherein the step of determining at least one first parameter for each node of the plurality of nodes comprises selecting a first implementation process among:
   a deposition chamber process, and
   a millimeter spatial confinement process, and
   a colloidal support structure process,
   the step of determining of the at least one first parameter of each node of the plurality of nodes being a function of the first implementation process.

10. The method according to claim 7, wherein the step of determining at least one first parameter for each node of the plurality of nodes comprises selecting a first implementation process among:
    a deposition chamber process, and
    a millimeter spatial confinement process, and
    a colloidal support structure process, the step of determining of the at least one first parameter of each node of the plurality of nodes being a function of the first implementation process.

11. The method according to claim 1, wherein the step of determining at least one second parameter for the at least one connection comprises selecting a second implementation process, the step of determining the at least one second parameter of the at least one connection being a function of the second implementation process.

12. The method according to claim 2, wherein the step of determining at least one second parameter for the at least one connection comprises selecting a second implementation process, the step of determining the at least one second parameter of the at least one connection being a function of the second implementation process.

13. The method according to claim 3, wherein the step of determining at least one second parameter for the at least one connection comprises selecting a second implementation process, the step of determining the at least one second parameter of the at least one connection being a function of the second implementation process.

14. The method according to claim 7, wherein the step of determining at least one second parameter for the at least one connection comprises selecting a second implementation process, the step of determining the at least one second parameter of the at least one connection being a function of the second implementation process.

15. The method according to claim 10, wherein the step of determining at least one second parameter for the at least one connection comprises selecting a second implementation process, the step of determining the at least one second parameter of the at least one connection being a function of the second implementation process.

16. The method according to claim 15 wherein the step of positioning each node of the plurality of nodes and the at least one connection comprises the following sub-steps:
determining at least one maximum dimension of the microfluidic circuit according to at least one first constraint associated with the first implementation process, and according to at least one second constraint associated with the second implementation process;
for each node of the plurality of nodes, determining a position of the node according to a maximum dimension of the microfluidic circuit, and the at least one first characteristic of the node, and the at least one first parameter of the node and the at least one first constraint associated with the first implementation process, and according to the at least one second constraint associated with the second implementation process;
determining a position of the at least one connection linking the one node of the plurality of nodes to the at least one other node of the plurality of nodes, according to a position and the at least one first characteristic of the node of the plurality of nodes and according to a position and the at least one first characteristic of the at least one other node of the plurality of nodes, and according to the at least one second characteristic and the at least one second parameter of the connection and according to the at least one first constraint associated with the first implementation process, and according to the at least one second constraint associated with the second implementation process.

* * * * *